United States Patent
Ito et al.

(10) Patent No.: US 6,843,816 B2
(45) Date of Patent: Jan. 18, 2005

(54) CERIUM-BASED ABRASIVE MATERIAL AND METHOD FOR PREPARATION THEREOF

(75) Inventors: Terunori Ito, Tokyo (JP); Naoyoshi Mochizuki, Tokyo (JP); Hiroyuki Watanabe, Tokyo (JP); Yoshitsugu Uchino, Tokyo (JP); Akira Shimogawara, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/467,481

(22) PCT Filed: Jan. 31, 2002

(86) PCT No.: PCT/JP02/00762

§ 371 (c)(1),
(2), (4) Date: Aug. 7, 2003

(87) PCT Pub. No.: WO02/062917

PCT Pub. Date: Aug. 15, 2002

(65) Prior Publication Data

US 2004/0093803 A1 May 20, 2004

(30) Foreign Application Priority Data

Feb. 7, 2001 (JP) ......................................... 2001-030774

(51) Int. Cl.$^7$ ............................. C09G 1/02; C09G 1/04; C09K 3/14
(52) U.S. Cl. ................................ 51/307; 51/309; 106/3
(58) Field of Search ........................... 51/307, 309, 293; 106/3; 423/263

(56) References Cited

U.S. PATENT DOCUMENTS 4,049,463 A * 9/1977 Hafner ..................... 106/401

FOREIGN PATENT DOCUMENTS

| JP | 7-81932 A | 3/1995 |
| JP | 9-67121 A | 3/1997 |
| JP | 10-106986 A | 4/1998 |
| JP | 10-106989 A | 4/1998 |
| JP | 10-106990 A | 4/1998 |
| JP | 10-226518 A | 8/1998 |
| JP | 2001-89748 A | 4/2001 |
| JP | 2002-97458 A | 4/2002 |

* cited by examiner

*Primary Examiner*—Michael Marcheschi
(74) *Attorney, Agent, or Firm*—Rothwell, Figg, Ernst & Manbeck, P.C.

(57) ABSTRACT

A cerium-based abrasive and a production method of the cerium-based abrasive excellent in polishing properties of a high polishing speed and scarce formation of polishing scratches are provided by keeping the color of the abrasive in specified ranges or stably making fluorine be contained in the abrasive. For example, as such a cerium-based abrasive, examples include a cerium-based abrasive containing cerium oxide as a main component and having an L* value in a range not lower than 65 and or lower 90, an a* value in a range 0 or higher but 15 or lower, and a b* value in a range 10 or higher but 30 or lower in the case the color is expressed by an L*a*b* color system.

10 Claims, No Drawings

CERIUM-BASED ABRASIVE MATERIAL AND METHOD FOR PREPARATION THEREOF

CROSS REFERENCE TO RELATED APPLICATION

This application is a 35 USC § 371 National Phase Entry Application from PCT/JP02100762, filed Jan. 31, 2002, and designating the U.S.

TECHNICAL FIELD

The present invention relates to a cerium-based abrasive and a production method of the cerium-based abrasive, more particularly, a cerium-based abrasive and a production method of the cerium-based abrasive excellent in polishing properties such as polishing speed-and polished surface.

BACKGROUND ART

Recently, an abrasive is employed for a variety of purposes. Above all, highly precise surface polishing is required for glass substrates such as a glass substrate for an optical disk, a glass substrate for a magnetic disk, a glass substrate for a photomask to be employed for semiconductor fabrication, a glass substrate for LCD and the like, an optical lens and the like.

For surface polishing for them, rare earth oxides, especially, a cerium-based abrasive containing cerium oxide as a mainly component (hereinafter referred as to a cerium-based abrasive) has been employed. Because as compared with zirconium oxide and silicon dioxide, cerium oxide is excellent in polishing properties for polishing glass. For example, since it has a high polishing speed as compared with zirconium oxide, silicon dioxide, aluminium oxide, and the like, cerium oxide is capable of performing polishing faster. Further, since cerium oxide has a hardness not so high, smoother glass surface can be obtained after polishing by using cerium oxide for polishing.

However, the polishing properties of the cerium-based abrasive are determined depending on a large number of factors such as contents of cerium oxide, fluorine (F) and the like, a specific surface area and the like. Consequently, to control the polishing properties, there are problems that the respective properties have to be precisely evaluated and comprehensively judged.

Further, the production conditions of the cerium-based abrasive are also important. For example, as one of most important steps, there is a roasting step in the latter half of the production process. The roasting step is a step of heating raw materials for the cerium-based abrasive at a high temperature in an oxidative atmosphere and in the step, fluorine, one of important factors determining the polishing properties, is easy to be dissipated from raw materials. Consequently, the roasting step has to be properly controlled. Especially, in the case of using an apparatus capable of carrying out continuous roasting, it is difficult to quickly and precisely judge the roasting state, thereby leaving difficulty in control as a problem.

The invention is developed to deal with such problems and aims to provide a cerium-based abrasive and a production method of the cerium-based abrasive excellent in polishing properties.

DISCLOSURE OF THE INVENTION

In polishing using a cerium-based abrasive, the following are required: the polishing speed is high (the polishing efficiency is high) and at the same time no scratch is formed and further the remaining abrasive after polishing is excellent to be cleaned out. In order to achieve such purposes, various physical values such as the size of the abrasive particles and chemical compositions have been investigated and variously tried to be optimized. No adhering to the viewpoints of the properties of an abrasive which have been thought ever before, inventors of the invention have made various investigations regarding abrasives evaluated to be excellent in polishing evaluation. As a result, it has been found the color of a cerium-based abrasive and the polishing evaluation have a correlation. Further investigations have consequently made it clear that an excellent abrasive can be obtained by optimizing the color of the cerium-based abrasive to complete the invention.

In a cerium-based abrasive containing cerium oxide as a main component, the invention has a characteristic that the cerium-based abrasive has an $L^*$ value 65 or higher and 90 or lower when a color of the cerium-based abrasive is expressed in an $L^*a^*b^*$ color system.

The color system $L^*a^*b^*$ (L-star, a-star, b-star) defined in JIS Z 8729 is very frequently used in the industrial field for color management and a color is expressed by a value of $L^*$, a value of $a^*$, and a value of $b^*$ (hereinafter referred as to $L^*$ value, $a^*$ value, and $b^*$ value, respectively). $L^*$ expresses brightness and is also called as "brightness index". On the other hand, $a^*$ and $b^*$ express hue and chromaticness and are also called as "chromaticness index". In the $L^*a^*b^*$ color system, as an $L^*$ value increases, a color becomes closer to white and as decreases, closer to black. Also, as an $a^*$ value is increased more in the plus side, a red type color is intensified more and as decreased more (increased more in the minus side), a green type color is intensified. Also, as a $b^*$ value is increased more in the plus side, a yellow type color is intensified more and as decreased more (increased more in the minus side), a blue type color is intensified. Also, if both $a^*$ value and $b^*$ value are zero together, it means colorless.

As a result of investigations, it has been found that, for a cerium-based abrasive, the state with a low $L^*$ value is a state particles of the abrasive are excessively grown and also a state with many coarse particles causing scratch formation at the time of polishing. If an abrasive in such a state is used, polishing scratches are easy to be formed, resulting in impossibility of obtaining a smoothly polished surface. On the other hand, it has also been found that the state with a high $L^*$ value is a state the particle growth by roasting is insufficiently promoted, resulting in impossibility of obtaining a sufficiently high polishing speed, difficulty of even dissipation in a dispersant, and easiness of scratch formation owing to remaining huge agglomerated particles. As a result of such investigations, it is found that a cerium-based abrasive with an $L^*$ value of 65 or higher and 90 or lower, preferably 70 or higher and 80 or lower, hardly causes scratches and is excellent in polishing properties such as smoothness.

The $a^*$ value in the $L^*a^*b^*$ color system is preferably 0 or higher and 15 or lower.

That is because if the $a^*$ value is lower than the range, the content of fluorine is so low as to make it impossible to cause chemical reactions needed at the time of polishing glass and make the extremely small rough state of the surface to be polished smooth. On the other hand, that is also because if the $a^*$ value is higher than the range, yet the polishing effect is high, the abrasive excessively contains fluorine and it is not preferable. Further, the content of the coarse particles is high to result in easiness of polishing scratch formation. That is supposedly attributed to the particle growth was excess at the time of roasting. From such viewpoints, the a* value is preferably 5 or higher and 15 or lower.

The b* value in the L*a*b* color system is preferably 10 or higher and 30 or lower.

That is because if the b* value is lower than the range, the contents of fluorine and praseodymium oxide are so low as to make it impossible to cause chemical reactions needed at the time of polishing glass and make the extremely small rough state of the surface to be polished smooth. On the other hand, that is also because if the b* value is higher than the range, yet the polishing effect (the polishing efficiency) is high, the abrasive excessively contains fluorine and is in a state that many coarse particles to be a cause of the polishing scratches are formed and it is not preferable. That is supposedly attributed to the particle growth was excess at the time of roasting. From such viewpoints, the b* value is preferably 20 or higher but 25 or lower.

As it is made understandable from above descriptions, a cerium-based abrasive with an L* value of the color system L*a*b* 65 or higher and 90 or lower, an a* value 0 or higher and 15 or lower, and a b* value 10 or higher but 30 or lower has a sufficiently high polishing speed, scarcely causes polishing scratches, scarcely leaves a remaining abrasive, and is stably provided with these excellent polishing properties. Consequently, such an abrasive is suitable to be used for precision polishing for which surface smoothness after polishing is especially required. It is further preferable if the L* value is 70 or higher but 80 or lower, the a* value is 5 or higher but 15 or lower, and the b* value is 20 or higher but 25 or lower. Incidentally, the L* value, the a* value, and the b* value can be recognized with eye observation by a person or a measurement apparatus. Consequently, for example, the quality can be judged or controlled by specifying the color of an abrasive by comparing the color of the cerium-based abrasive with that of a standardized product or the quality can be judged or controlled by specifying the color by employing a measurement apparatus.

Incidentally, the color control to make a cerium-based abrasive have a desired color can be actualized by controlling the content of fluorine and further controlling the content of praseodymium oxide. For example, the color of an abrasive powder is measured in the roasting step in the production process and the roasting temperature, the roasting duration, the gas circulation state in a roasting furnace, and the supply speed to the roasting furnace are adjusted to easily keep the L* value, the a* value, and the b* value in specified ranges, respectively, in the L*a*b* color system. The polishing properties regarding the polishing speed, the polishing scratches, the remaining abrasive and the like can easily be controlled by keeping the color of the cerium-based abrasive in the above-described specific ranges.

The cerium-based abrasive contains, as rare earth oxides other than cerium oxide ($CeO_2$), lanthanum oxide ($La_2O_3$), neodymium oxide ($Nd_2O_3$), praseodymium oxide ($Pr_6O_{11}$), samarium oxide ($Sm_2O_3$), and the like. Since rare earth elements are similar in chemical and physical properties to one another, they are difficult to be separated. However, they do not significantly inhibit the effect as an abrasive. Those to be used as abrasives are those containing cerium oxide as a main component and generally, the ratio, that is, the content, of cerium oxide in the total rare earth oxides (hereinafter, abbreviated as TREO) is required to be 30% by weight or higher. Because if the content of cerium oxide in TREO is less than 30% by weight, a sufficient polishing speed cannot be obtained to result in insufficiency for practical use. If the value is 30% by weight or higher, practical use for polishing, especially for polishing glass is possible.

Further, in the cerium-based abrasive, other than rare earth oxides, there remain oxides of such as Si, Al, Na, K, Ca, Ba and the like or compounds other than oxides contained in minerals such as bastnasite. Some of them have a function as an abrasive, yet the function is low, and become a cause of polishing scratches. For that, the content of TREO in the cerium-based abrasive is controlled to be 80% by weight or higher but 99% by weight or lower. If TREO is less than 80% by weight, many polishing scratches are formed. If TREO exceeds 99% by weight, the productivity is lowered in order to increase the purity.

Further, it is important to contain a fluorine component as the cerium-based abrasive, especially as an abrasive for glass. That is, because it is supposed to be probable that existence of the fluorine component makes chemical polishing possible to increase the smoothness of the polishing surface.

As a result of such investigations, the cerium-based abrasive of the invention is found preferable to have the content of TREO in itself 80% by weight or higher but 99% by weight or lower and the content of fluorine in TREO 0.5% by weight or higher but 10% by weight or lower.

Because it is found if the content of fluorine in TREO is 0.5% by weight or higher, an excellent polishing effect especially for use for polishing glass can be obtained owing to not only simply physical polishing but also chemical reactions by fluorine. Because, in other words, if the content of fluorine is less than 0.5% by weight, the polishing speed is too low for practical use. Further if the content of fluorine exceeds 10% by weight, an interior of a roasting furnace is vulnerable to corrosion and the cost for waste-gas treatment will be higher, disadvantageously.

Incidentally, the content of fluorine is a value calculated by quantitatively measuring fluorine of the same specimen as a specimen of which TREO is measured and calculating the weight as the content in TREO. The reason for doing that is because almost all of fluorine is lost at the time of TREO measurement and therefore even if fluorine is measured in a specimen obtained after the TREO measurement, no precise value can be obtained.

The cerium-based abrasive is preferable to have a content of praseodymium oxide contained in TREO 1% by weight or higher but 10% by weight or lower.

As described above, it is important for the cerium-based abrasive, especially as an abrasive for glass, to contain a fluorine component. Consequently, if dissipation of fluorine at the time of roasting proceeds to the extent too far, the probability that the fluorine component contained in the abrasive is too slight is high and it is not preferable. An investigation of the roasting step has, therefore, been made to find difference exists in the degree of the dissipation of the fluorine component even if the roasting conditions are made constant in the roasting step.

Hence, the chemical behavior of rare earth elements other than cerium, and fluorine at the time of roasting has been investigated. As a result, a variety of light rare earth elements other than cerium are found having the effectiveness of the effect to prevent the dissipation of fluorine in the roasting step and among them, especially, existence of praseodymium or praseodymium oxide is excellent in the dissipation-preventive effect on the fluorine. For example, in the case fluorine is immobilized in form of a fluorine-containing compound of praseodymium, a chemical polishing function in polishing, supposedly derived from the fluorine component, can be obtained and consequently, a high polishing speed can be obtained and excellent surface smoothness is obtained.

The reasons for the excellent dissipation-preventive effect are supposedly as follows. At first, praseodymium in a form of praseodymium compounds (e.g., praseodymium oxide), the oxidation number can be not only +3, which is common in the case of rare earth elements, but also a value higher than +3, and especially a value higher than +3 is stable in the case of praseodymium oxide: praseodymium forms a composite composition of the oxide and the fluoride and it is thermally stable: and the like.

From such investigation results, praseodymium compounds including praseodymium oxide were found preventing the dissipation of fluorine at the time of roasting. And the particle growth of raw materials for the cerium-based abrasive is found possible to be controlled by adjusting the content of praseodymium oxide to be a proper ratio. Hence, the content of fluorine and the content of praseodymium oxide necessary for polishing have further been investigated.

As a result, the content of praseodymium oxide is found to be preferably, as described above, 1% by weight or higher and 10% by weight or lower. Because if the content of praseodymium oxide is less than 1% by weight, the dissipation of fluorine at the time of roasting cannot be prevented. Further, in the case the content is low, the particle growth sometimes does not proceed and the obtained cerium-based abrasive does not have a sufficiently high polishing speed. Further, in order to adjust the content of praseodymium oxide to be lower than 1% by weight in the abrasive prediction steps, a special treatment is required to remove praseodymium compounds including praseodymium oxide to cause a problem in terms of the cost. On the other hand, if the content of praseodymium oxide exceeds 10% by weight, immobilization of fluorine in the roasting step is sufficient to obtain a sufficiently high polishing speed, however there occurs a problem that the particle growth proceeds excessively. Further, since the color of the cerium-based abrasive becomes too dark owing to the excessively high content of praseodymium oxide, the difference becomes difficult to be detected by colorimetric results, especially based on the a* value to make quality control of abrasives by colorimetry difficult. Further, as compared with cerium oxide, praseodymium oxide has high hydrophilicity and in the case of an abrasive slurry, there occurs a problem that the polishing speed is changed owing to the alteration of pH of the slurry.

Further, the cerium-based abrasive is preferable to have the specific surface area of abrasive particles 1 $m^2/g$ or higher but 30 $m^2/g$ or lower.

If the specific surface area is lower than 1 $m^2/g$, yet the polishing speed is sufficiently high, there exists a problem that the polishing precision is low and polishing scratches are many. If the specific surface area exceeds 30 $m^2/g$, if a slurry in which an abrasive is sufficiently dispersed is used, a smoothly polished surface can be obtained after polishing, however preparation of a sufficiently dispersed slurry itself is difficult. Further, since a sufficient polishing speed cannot be obtained, the work efficiency of polishing glass or the like is low to make practical use difficult. Further, since the amount of the remaining abrasive increases, it is a problem to use as an abrasive for precision polishing.

From such a point of view, if the value of the specific surface area is kept in the above-described range, an abrasive obtained is excellent in polishing properties; a sufficiently high polishing speed, less formation of polishing scratches at the time of polishing, capability of giving smoother polished face after polishing with little remaining of the abrasive on the polished face after polishing.

Incidentally, the cerium-based abrasive according to the invention may be used as an abrasive slurry by being mixed with and dispersed in water or an organic solvent. The concentration of the cerium-based abrasive (the solid matter) in the abrasive slurry is preferably 1% by weight or higher but 40% by weight or lower, further preferably 5% by weight or higher and 30% by weight or lower. Examples as the organic solvent usable are alcohol, a polyhydric alcohol, tetrahydrofuran and the like. The reason for the setting of the cerium-based abrasive to be 1% by weight or higher but 40% by weight or lower is because if it is lower than 1% by weight, it causes undesirable results that the polishing efficiency is low owing to the low concentration and a large quantity of polishing waste solution is generated as well. On the other hand, it is also because if it exceeds 40% by weight, the viscosity of the slurry becomes high to make quantitative and constant supply of the slurry difficult to result in uneven polishing and it is also not preferable.

The abrasive slurry may further contain additives such as a dispersing agent, a solidification-preventive agent, a pH adjusting agent and the like. As the additives, examples are sodium hexametaphosphate, sodium pyrophosphate, crystalline cellulose, calcium secondary phosphate, sodium β-naphthalene sulfonate-formalin condensate, synthetic silicon dioxide, polyacrylic acid salt such as polyacrylic acid sodium salt, carboxymethyl cellulose, polyethylene oxide, polyvinyl alcohol and the like. These additives may be mixed with the cerium-based abrasive at first and made to be slurry of the cerium-based abrasive containing the additives; or the additives may be dissolved or dispersed at first in water or an organic solvent and then the cerium-based abrasive is dispersed; or the additives may be added when the cerium-based abrasive is made to be a slurry using water or an organic solvent. The weight of the additives is generally 0.1% by weight or higher but 4% by weight or lower to the weight of the cerium-based abrasive (the solid matter). That is because if less than 1% by weight, the effects of dissipation, solidification prevention, and pH adjustment are insufficient and if exceeding 4% by weight, the effects are scarcely increased and on the contrary, the effects are sometimes deteriorated.

Further, in order to solve the above-described problems, a method for producing a cerium-based abrasive has been investigated. The cerium-based abrasive is produced through the respective steps of pulverizing raw materials of the cerium-based abrasive, carrying out treatment with fluorine if necessary, roasting, pulverizing and classifying the successively treated raw materials. Incidentally, a well-known treatment method to be carried out using hydrofluoric acid, ammonium fluoride and the like can optionally be employed for the treatment with fluorine.

Inventors of the invention have made investigations while paying attention to the roasting step among these steps. The roasting step is a step of promoting the particle growth while carrying out sintering of the particles and also a step of dissipating fluorine at the same time. Consequently, if both of the particle growth and the fluorine content can be controlled in the roasting step, it is desirable for the production of the cerium-based abrasive excellent in polishing properties. Therefore, a roasting step for controlling the dissipation of fluorine has been investigated.

As a result, it has been found that an abrasive can stably be sintered and at the same time an amount of fluorine needed for the chemical polishing can reliably be maintained by controlling the fluorine content after roasting based on the fluorine content before roasting. That is, inventors of the invention have found it is possible to produce the cerium-based abrasive excellent in polishing properties and consequently capable of providing excellent polishing evaluations by measuring the content of fluorine before and after roasting and controlling the decrease amount.

The invention provides a cerium-based abrasive production method comprising a step of roasting raw materials of the cerium-based abrasive, characterized in that in the case the content of fluorine in relation to TREO before roasting is defined as F1 (hereinafter simply referred as to F1) and the content of fluorine in relation to TREO after roasting is defined as F2 (hereinafter simply referred as to F2), the method keeps the ratio F2/F1 in a range 0.7 or higher but 1 or lower.

Because if F2/F1 is lower than 0.7, the particle growth proceeds excessively to result in a problem that the amount of coarse particles to be a cause of formation of polishing scratches is increased. Such a problem is caused by, for example, a high roasting temperature or a too long roasting duration. Further, if F2/F1 is lower than 0.7, the cost for the waste gas treatment is problematically increased. Incidentally, unless a fluorine component is supplied, F2/F1 does not exceed 1 and it is generally lower than 1. Further, F2/F1 is preferably 0.75 or higher but 0.95 or lower. If within the range, roasting can further stably be carried out.

In this production method, roasting is carried out while adjusting the roasting temperature, the roasting duration, the gas circulation state in a roasting furnace, and the supply speed to the roasting so as to keep F2/F1 in a range 0.7 or higher but 1 or lower. Hence, the content of fluorine is easily controlled and the polishing properties and the polishing evaluation can properly be adjusted. Consequently, a cerium-based abrasive can be produced with excellent polishing properties such as scarcity of scratch formation at the time of polishing, capability of providing smoothness of the polished face of an object obtained after polishing, and the like. In such a manner, the production method of the invention has a characteristic that an attention is paid only to the fluorine content and its ratio alone is controlled but the roasting temperature, the roasting duration, the roasting quantity per time and other variety of operation conditions are not required to be separately controlled. Such a method is extremely simple and easy to control the roasting step and preferable.

Further, investigation has been made regarding the control of the color of a cerium-based abrasive by the production method of the cerium-based abrasive. The color of the cerium-based abrasive is affected by the content of fluorine, the oxidation degree, the specific surface area expressing the particle size and the like. Consequently, controlling the color of the raw materials of the cerium-based abrasive to be a desired one by controlling those factors makes it possible to produce the cerium-based abrasive with excellent polishing properties. However, conventionally, an easy method for controlling the color, especially, a method for easily controlling the color in the roasting step, has not been made available. For example, as described above, although the color control of the cerium-based abrasive is made possible by adjusting the roasting temperature, the roasting duration, the gas circulation state in a roasting furnace, and the supply speed to the roasting furnace, it is not necessarily always precise to obtain a desired color of the cerium-based abrasive.

As a result, the production method of the cerium-based abrasive of the invention has been found suitable for controlling the color of the cerium-based abrasive. This production method, as described above, employs an extremely simple and easy means as the roasting step and it is therefore supposed to possible to relatively easily adjust the color of the cerium-based abrasive.

For example, if F2/F1 is controlled to be in a range 0.7 or higher but 1 or lower by the roasting step in the production method of the cerium-based abrasive according to the invention, the cerium-based abrasive can be produced with a color having an L* value 65 or higher but 90 or lower in the case of defining the color with the L*a*b* color system. The cerium-based abrasive produced in such a manner, as described above, has advantages that it has a sufficiently high polishing speed, scarcely causes polishing scratches, and is capable of providing a polished surface with excellent smoothness and a high polishing precision accompanied with little remaining abrasive.

As raw materials for the cerium-based abrasive to be employed for the production method of the cerium-based abrasive of the invention, those preferable have the content of praseodymium oxide 1% by weight or higher and 10% by weight or lower in TREO and the fluorine content F1 in relation to TREO before roasting 0.5% by weight or higher but 14.3% by weight or lower.

The fluorine content in relation to TREO of the cerium-based abrasive can be assumed to be F2 (the fluorine content in relation to TREO after roasting). Consequently, F2 is to be preferable, for example, 0.5% by weight or higher but 10% by weight or lower. In this case, taking the production condition, "F2/F1 is 0.7 or higher and 1 or lower", as described above into consideration, it is preferable for F1 to be 0.5% by weight or higher but 14.3% by weight or lower. Further, in order to keep F2 more reliably be 0.5% by weight or higher but 10% by weight or lower, F1 is preferable to be 0.7% by weight or higher but 10% by weight or lower. The reasons for the preference for such ranges are as described above. Further, in the production of the cerium-based abrasive, in th case of a high fluorine content, waste gas treatment at the time of roasting is required and a problem of corrosion of furnace materials inconveniently takes place. In consideration of such a point of view, F1 is preferable to be 10% by weight or lower.

Controlling F2/F1 in the roasting step and at the same time controlling the content of praseodymium oxide in TREO of raw materials and the fluorine content F1 in relation to TREO before roasting make it easy to produce the abrasive having not only an L* value in a range 65 or higher and 90 or lower but also an a* value 0 or higher and 15 or lower and a b* value 10 or higher and 30 or lower.

Further, in the case the fluorine content in relation to TREO in the raw materials for the cerium-based abrasive is lower than 0.5% by weight, or even if it is 0.5% by weight or higher, in the case the fluorine content in relation to TREO is wanted to be increased, the treatment with fluorine as described above is carried out to control F1 0.5% by weight or higher but 14.3% by weight or lower. Incidentally, the content of TREO in the cerium-based abrasive to be produced, the contents of cerium oxide and praseodymium oxide in TREO, and further the fluorine content are as described above.

The contents of cerium oxide and rare earth oxides such as praseodymium oxide in TREO can be assumed to be unchanged between those in the raw materials for the cerium-based abrasive and the cerium-based abrasive. Consequently, those having the contents of cerium oxide and praseodymium oxide in TREO within the ranges of the values defined to be preferable in the cerium-based abrasive are preferable to be used as raw materials for the cerium-based abrasive. Incidentally, the content of TREO in the raw materials sometimes becomes lower than 80% by weight depending on the contents of water and carbonate residue in the raw materials, however usually since impurities are slight, the content of TREO reaches 80% by weight or higher after roasting and therefore it does not cause a problem.

Further, in the roasting step, it is preferable that the roasting temperature is 600° C. or higher but 1,200° C. or lower and the roasting duration is 1 hour or longer but 60 hours or shorter.

In the roasting, cerium-containing particulate rare earth elements as raw materials are subjected to particle growth to a size enabling proper polishing speed. As the roasting means, for example, an electric furnace, a rotary kiln, and the like can be employed. The ambient atmosphere is preferable to be oxidative atmosphere and, for example, the atmospheric air can be used as the ambient atmosphere. Generally, if the roasting temperature is high, abnormal particle growth easily takes place and the amount of coarse particles in the abrasive is easy to be increased, however it has been found as a result of the investigation that praseodymium compounds including praseodymium oxide suppress the abnormal particle growth and at the same time promotes even roasting of the raw materials to be effective to suppress the amount of the coarse particles. Consequently, if raw materials containing praseodymium compounds including praseodymium oxide are used, roasting can be carried out at a higher temperature. If roasting is carried out at a high temperature, sintering is easy to be promoted, so that it is especially effective in the case an abrasive with a large average particle size is obtained and in the case an abrasive with a large average particle size and a sufficiently high polishing speed. Yet the content of praseodymium compounds including praseodymium oxide in the raw materials is not particularly restricted, the proper content is to give the content of praseodymium oxide within a range 1% by weight or higher but 10% by weight or lower in TREO in the abrasive. Incidentally, the color of the cerium-based abrasive is affected by the roasting temperature, the above described temperature range is preferable from this point of view.

MODES FOR CARRYING OUT THE INVENTION

Hereinafter, practical embodiments of the invention will be described.

At first, raw material slurries were obtained by pulverizing raw materials for cerium-based abrasives by a wet type ball mill. Incidentally, as the raw materials, bastnasite concentrate, rare earth oxides, and cerium oxide were used. After that, no fluorine treatment was carried out for Example 1, Example 2, and Comparative Example 2. On the other hand, fluorine treatment was carried out respectively in order to increase the fluorine content for Example 3 and Comparative Example 1, in order to add fluorine to the rare earth oxides as raw materials for Examples 4 to 6 and Comparative Example 3, and in order to add fluorine to cerium oxide for Comparative Example 4. After that, the slurries were filtered and dried at 120° C to obtain powders. The respective powders obtained after drying were roasting in a range of 800 to 1,100° C. for 3 hours. Then, the powders obtained after roasting were pulverized and classified in order to decrease coarse particles with a size of 10 $\mu$m or larger as much as possible and thus cerium-based abrasives were obtained.

The contents of cerium oxide ($CeO_2$) and praseodymium oxide ($Pr_6O_{11}$) before roasting, the fluoride content (<F1>) before roasting, the fluoride content (<F2>) after roasting, the content of TREO after roasting, and the yield (<F2/F1>) of fluoride by roasting were measured. The measurement results were shown in Table 1.

The fluorine content is a value measured by an alkaline melting-warm water extraction-fluoride ion electrode method. That is a measurement method as follows. At first, an abrasive or raw materials of the abrasive as specimens were melted with an alkaline melting agent, subjected to extraction with warm water after being cooled spontaneously and made to be constant in volume. A proper amount of the resulting specimen was sampled, mixed with a buffer solution and then adjusted to have pH about 5.3 and made to be constant in volume to obtain a sample solution. Also, standard solutions were prepared. The operation for obtaining the standard solutions was same as that for obtaining the sample solution except that no specimen was used and a fluoride ion standard solution was added after the sampling to adjust the fluoride ion content to be a desired value. Several kinds of standard solutions were obtained by changing the fluoride ion concentration. Regarding the standard solutions and the sample solutions obtained in such a manner, the respective fluoride ion contents were measured using an ion meter equipped with a fluoride ion electrode. More practically, the fluoride ion concentrations of the sample solutions were obtained based on a calibration curve obtained by measurement for the standard solutions and the obtained fluoride ion concentrations were converted into the fluorine contents of specimens. Further, the obtained fluorine contents were divided with the TREO contents of specimens described below to obtain the fluorine content in relation to TREO. Incidentally, the fluorine contents before roasting were measured by drying specimens before roasting at 120° C. for 2 hours and subjecting the resulting specimens to the same operation as that carried out for the abrasives after roasting.

The TREO contents were measured as follows. At first, specimens were decomposed using perhydrochloric acid and hydrogen peroxide and then oxalic acid was added to the resulting solutions and pH of the solutions was kept about 1.5 to obtain precipitates. The precipitates were filtered and obtained precipitates were roasted at 1,000° C. The weights of the roasted materials were measured and the TREO content was calculated based on the weight of the roasted materials in relation to the weights of the specimens.

Cerium oxide and praseodymium oxide contents were measured using an alkaline melting agent and ICP emission spectrophotometry. At first, specimens were dissolved in an acid or alkaline melted and then the respective specimens were sampled in a proper amount and made to be constant in volume to obtain samples. Also, several kinds of standard samples with changed concentrations of cerium or the like were prepared. The contents of cerium or the like of the samples were quantitatively measured based on the calibration curve showing the concentrations of cerium or the like obtained by measurement for the standard samples, and were converted into the cerium oxide and praseodymium oxide contents. The cerium oxide and praseodymium oxide contents in TREO were calculated from the cerium oxide and praseodymium oxide contents in the respective samples and the contents of TREO in the samples.

TABLE 1

CHEMICAL ANALYSIS RESULTS AND YIELD OF FLUORINE

| | | Chemical analysis before roasting | | | Roasting step | Chemical analysis after roasting | | |
|---|---|---|---|---|---|---|---|---|
| | Raw material | $CeO_2$/TREO (wt %) | $Pr_6O_{11}$/ TREO (wt %) | F/TREO <F1> (wt %) | Roasting temperature (° C.) | TREO (wt %) | F/TREO <F2> (wt %) | Yield of fluorine <F2/F1> |
| Example 1 | bastnasite | 50 | 3 | 8 | 800 | 83 | 6.7 | 0.84 |
| Example 2 | bastnasite | 50 | 3 | 8 | 900 | 85 | 6.0 | 0.75 |
| Example 3 | bastnasite | 50 | 3 | 10 | 1000 | 89 | 7.1 | 0.71 |
| Example 4 | rare earth oxides | 60 | 5 | 8 | 850 | 90 | 7.1 | 0.89 |
| Example 5 | rare earth oxides | 60 | 5 | 8 | 900 | 92 | 6.8 | 0.85 |
| Example 6 | rare earth oxides | 60 | 5 | 8 | 1000 | 93 | 6.1 | 0.76 |
| Comparative Example 1 | bastnasite | 50 | 3 | 15 | 1000 | 84 | 7.3 | 0.49 |
| Comparative Example 2 | rare earth oxides | 60 | 5 | <0.1 | 900 | 97 | <0.1 | —[1] |
| Comparative Example 3 | rare earth oxides | 60 | 5 | 8 | 1100 | 94 | 4.3 | 0.54 |
| Comparative Example 4 | cerium oxide | 99 | 0 | 3 | 800 | 99 | <0.1 | <0.03 |

[1] No significant numerals were calculable.

As it is made clear from Table 1, in Examples 1 to 6, the yield of fluorine (F2/F1) was 0.7 or higher. It was supposedly owing to the effect attributed that the contents of cerium oxide, praseodymium oxide and fluorine were in respectively prescribed ranges. On the other hand, in Comparative Example 1, the yield was low. It was supposedly owing to excess fluorine relative to praseodymium oxide. In Comparative Example 3, the yield of fluorine was low. It was supposedly attributed to the high roasting temperature. In Comparative Example 4, almost all fluorine was dispersed and dissipation of fluorine could not be prevented by roasting. It was supposedly attributed to no content of praseodymium oxide.

Further, the cerium-based abrasives obtained in the respective examples and Comparative Examples were subjected to color measurement (by a color and color difference meter: CR-300, manufactured by Minolta Co., Ltd.) and the specific surface area measurement (by a BET specific surface area measurement apparatus using nitrogen gas: Multisorp, manufactured by Uasa Ionics Co.). Further, a polishing test was carried out to measure the polishing properties of finally obtained cerium-based abrasives. The measurement results and the results of the polishing test were shown in Table 2. Incidentally, although the color measurement was carried out after pulverization after the roasting, in other words, before the classifying step, the color of each abrasive product was found almost the same before and after the classifying step, so that the colors of the cerium-based abrasives wer shown in Table 2.

Incidentally, in the polishing test, an Osker type polishing machine (HSP-21 model, manufactured by Taito Seiki Co., Ltd.) was employed. For the polishing test, cerium-based abrasive slurries having the abrasive concentration of 10% by weight and prepared by dispersing the powder type cerium-based abrasives in water were used. The object to be polished was a glass material for a flat panel with 65 mm$\phi$ and a polishing pad made of a polyurethane was used. The polishing conditions were as follows: the rotation speed of the glass material was 1,700 rpm; the pushing pressure of the pad was 98 kPa (1 kg/cm$^2$), and the polishing duration was 10 minutes.

The polishing values in Table 2 were the values based on the polishing amounts calculated by measuring the weight of the glass material before and after polishing. They were expressed as relative values in the case the value of Example 1 was set to be 100.

The polishing scratches were evaluated as follows. At first light of a halogen lamp with 300,000 lux light source was radiated to the surface of the glass for a flat panel after polishing and the number and the size of the scratches were judged by a reflection method. Then, corresponding to the number and the size of the scratches, the results were numerary expressed by a minus-point system on the basis of 100 marks. In Table 2, "E" showed to be 95 or higher and 100 or lower marks and extremely suitable for precision polishing; "G" showed to be 90 or higher but lower than 95 marks and suitable for precision polishing; "F" showed to be or higher 80 and lower than 90 marks and usable for general polishing; and "P" showed to be lower than 80 and unsuitable as an abrasive, respectively.

The evaluation of the remaining abrasives was carried out as follows. At first, the glass after polishing was washed in pure water using an ultrasonic washing apparatus and dried in dust-free state. After that, the glass surface was observed by an optical microscope and the existence of the residual abrasives adhering to the glass surface was observed. In Table 2, "E" showed the residual abrasives were scarcely observed to prove extreme suitability as an abrasive; "G" showed the residual abrasives were slightly observed to prove suitability as an abrasive; and "P" showed many residual abrasives were observed to prove unsuitability as an abrasive, respectively.

TABLE 2

COLOR, THE SPECIFIC SURFACE AREA, AND POLISHING PROPERTIES OF CERIUM-BASED ABRASIVE

| | Physical measurement after roasting | | | | Evaluation of polishing | | |
|---|---|---|---|---|---|---|---|
| | Measured color of powder | | | Specific surface | Polishing | Polishing | Residual |
| | L* value | a* value | b* value | area (m$^2$/g) | value | scratch[1] | abrasive[2] |
| Example 1 | 85.52 | 4.86 | 17.64 | 7.9 | 100 | E | G |
| Example 2 | 77.87 | 5.94 | 20.78 | 2.5 | 180 | E | E |
| Example 3 | 74.53 | 8.76 | 22.45 | 1.6 | 330 | G | E |
| Example 4 | 75.48 | 11.27 | 19.84 | 6.1 | 120 | E | G |
| Example 5 | 74.12 | 12.55 | 21.29 | 3.5 | 155 | E | E |
| Example 6 | 72.23 | 14.90 | 24.12 | 2.9 | 170 | E | E |
| Comparative Example 1 | 64.43 | 16.85 | 18.87 | 1.0 | 400 | P | E |
| Comparative Example 2 | 49.74 | 11.05 | 9.36 | 13.2 | 25 | P | P |
| Comparative Example 3 | 60.19 | 19.41 | 19.28 | 0.7 | 450 | P | E |
| Comparative Example 4 | 94.53 | −1.95 | 2.40 | 9.5 | 75 | G | P |

*[1]The reference characters of the polishing scratch respectively denote as follows:
"E": extremely suitable for precision polishing if the mark is 95 or higher and 100 or lower.
"G": suitable for precision polishing if the mark is or higher 90 and lower than 95.
"F": usable for general polishing if the mark is or higher 80 and lower than 90.
"P": unsuitable as an abrasive if the mark is lower than 80.
[2]The reference characters of the residual abrasive respectively denote as follows:
"E": extremely suitable as an abrasive.
"G": suitable as an abrasive.
"P": unsuitable as an abrasive.

As shown in Table 2, in Examples 1 to 6, the L* values in the L*a*b* color system were all in a range 65 or higher but 90 or lower: the a* values were all in a range 0 or higher but 15 or lower: b* values all in a range 10 or higher but 30 or lower: and the specific surface area was 1 to 30 m$^2$/g, proving any of the polishing values, the polishing scratches, and the residual abrasives, which were polishing properties, to be excellent.

However, in Comparative Example 1, fluorine was found existing excessively and the specific surface area was small and the polishing scratches were many. The b* value was 18.87, whereas the L* value was lower than 65 and the a* value was higher than 15.

In Comparative Example 2, the specific surface area was high and the polishing value was extremely low and the residual abrasive was high in quantity. It was supposedly attributed to scarce existence of fluorine. The L* value was 49.74, lower than 65 and the a* value was 1.05, lower than 15, and further the b* value was 9.36, lower than 10.

In Comparative Example 3, many polishing scratches were observed. The b* value was 19.28, whereas the L* value was 60.19, lower than 65 and the a* value was 19.41, higher than 15.

In Comparative Example 4, the residual abrasive was high in quantity. The L* value was 94.53, higher than 90. It was supposedly attributed to no existence of praseodymium oxide. Further, the a* value was −1.95 with the inverse sign showing the color change toward green and also the b* value was 2.40, extremely small as compared with 10.

Industrial Applicability

The invention can provide a cerium-based abrasive excellent in the polishing properties; a sufficiently high polishing speed and scarce probability of causing polishing scratches and leaving little remaining abrasive. Further, the invention provides a production method of such a cerium-based abrasive. The abrasive provided can be used for surface polishing with a high precision required in production of glass substrates for optical disks and magnetic disks and the like.

What is claimed is:

1. An abrasive containing cerium oxide as a main component, wherein the abrasive contains fluorine and has an L* value of 65–90 and wherein the color of the abrasive is expressed by an L*a*b* color system.

2. The according to claim 1, wherein the a* value in the L*a*b* color system is 0–15.

3. The abrasive according to claim 1, wherein the b* value in the L*a*b* color system is 10–30.

4. The abrasive according to claim 1, wherein the content of total rare earth oxides (TREO) in the abrasive is 80–99% by weight and the content of fluorine relative to TREO is 0.5–10% by weight.

5. The according to claim 4, further comprising praseodymium oxide in the amount of 1–10% by weight based on the total weight % of TREO.

6. The according to claim 1, in the form of particles having a specific surface area of 1–30 m$_2$/g.

7. A method for producing an abrasive containing cerium oxide as a main component and fluorine, comprising roasting raw materials for the abrasive, wherein a ratio F2/F1 is 0.7–1, and wherein F1 is the content of fluorine in the raw materials in relation to TREO before roasting F1 and F2 is the content of fluorine in the abrasive in relation to TREO after roasting.

8. The method according to claim 7, wherein raw materials for the abrasive further comprise praseodymium oxide in the amount of 1–10% by weight based on the total weight % of TREO and wherein F1 is 0.5–14.3% by weight.

9. The method according to claim 8, wherein the roasting is at a roasting temperature of 600–1,200° C. and a roasting duration of 1–60 hours.

10. A method for improving the polishing properties of an abrasive containing cerium oxide as a main component, the method comprising adding fluorine to the abrasive in an amount such that the abrasive has an L* value of 65–90 when the color of the abrasive is expressed by an L*a*b* color system.

* * * * *